(12) United States Patent
Bourdev (10) Patent No.: US 7,730,043 B1
(45) Date of Patent: Jun. 1, 2010

(54) INCREMENTAL BATCH-MODE EDITING OF DIGITAL MEDIA OBJECTS

(75) Inventor: Lubomir Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1007 days.

(21) Appl. No.: 11/478,277

(22) Filed: Jun. 29, 2006

(51) Int. Cl.
*H06F 12/00* (2006.01)
(52) U.S. Cl. ...................................... 707/695; 707/803
(58) Field of Classification Search ................ 707/7–10, 707/103 R, 104.1, 200–206
See application file for complete search history.

(56) References Cited

U.S. PATENT DOCUMENTS

| | | | |
|---|---|---|---|
| 5,583,665 | A | 12/1996 | Gregory et al. |
| 6,097,389 | A | 8/2000 | Morris et al. |
| 6,202,073 | B1 | 3/2001 | Takahashi |
| 6,282,330 | B1 | 8/2001 | Yokota et al. |
| 6,883,140 | B1 | 4/2005 | Acker et al. |
| 7,039,222 | B2 | 5/2006 | Simon |
| 2004/0153649 | A1* | 8/2004 | Rhoads et al. ............ 713/176 |
| 2005/0259104 | A1 | 11/2005 | Koguchi |
| 2005/0259284 | A1 | 11/2005 | Tanaka |
| 2006/0056671 | A1 | 3/2006 | Ghosh et al. |
| 2006/0092474 | A1 | 5/2006 | Ramsay et al. |
| 2006/0198559 | A1* | 9/2006 | Manico et al. ............ 382/305 |
| 2007/0250532 | A1* | 10/2007 | Beato et al. ............. 707/103 R |
| 2007/0252896 | A1* | 11/2007 | Hatanaka et al. ......... 348/207.1 |
| 2007/0260809 | A1* | 11/2007 | Hara et al. .................. 711/101 |

* cited by examiner

*Primary Examiner*—Wilson Lee
(74) *Attorney, Agent, or Firm*—Robert C Kowert; Meyertons, Hood, Kivlin, Kowert & Goetzel, P.C.

(57) ABSTRACT

A system for incremental batch-mode editing of digital media objects includes one or more processors and memory coupled to the processors, where the memory stores program instructions executable by the processors to implement a media management tool. The media management tool is configured to receive a batch request indicating a plurality of modification operations to be performed on a plurality of digital media objects, and to perform the modification operations in a particular sequence. After a particular modification operation is performed, the media management tool is configured to provide a representation of one or more digital media objects affected by the modification operation, and receive input or feedback pertaining to the modification operation. The input may, for example, indicate respective versions of one or more digital media objects on which the next modification operation in the particular sequence is to be performed.

31 Claims, 9 Drawing Sheets

INCREMENTAL BATCH-MODE EDITING OF DIGITAL MEDIA OBJECTS

BACKGROUND

1. Field of the Invention

The present invention is directed to computer systems. More particularly, it is directed to management of digital media objects using computer systems.

2. Description of the Related Art

In recent years, the advent of cheap processing power, storage devices and networking capabilities has made digital manipulation and transmission of media objects such as photographs, movies, and audio files more and more common. The sales of digital media management devices such as recording and playback devices for audio and video as well as digital cameras have increased at a rapid pace. In addition, more and more users, including media professionals as well as amateurs with varying levels of skill, have begun using software tools to manage their media assets. A number of different software tools and services may be used, for example, to perform tasks related to digital photographs, such as organizing an album, creating slide shows, adding captions, making photographs accessible to friends and family via the Internet, e-mailing photographs, and the like. Other tools may allow a user to purchase audio content over the Internet, categorize a collection of MP3 or other digital audio files into "playlists", exchange songs with friends, and so on.

As the prices for acquiring and storing digital media objects continues to fall, the number of objects that a typical professional or amateur user may have to manage may increase dramatically. For example, a family with one or more digital cameras may acquire thousands of digital photographs relatively quickly. Unfortunately, depending on the source from which the digital media objects are obtained, the quality of the objects' content may vary widely. For example, even experienced users of relatively sophisticated digital cameras may sometimes take photographs that may benefit from editing operations such as cropping, sharpening, changing light levels, removal of "red-eye" (a phenomenon in which photography subjects' eyes appear to be red as a result of a use of a flash), and the like. Manipulating each photograph of a large photograph collection individually to correct its defects may require more time and effort than a typical user may desire.

Some digital media management software, such as certain photography tools, may support batch-mode operations to help users with the management of large numbers of media objects. For example, a sequence of modification or correction operations, such as image sharpening, contrast increase, cropping, auto-orientation correction, and/or red-eye removal may be recorded for one digital photograph, and then applied as a batch operation to a set of photographs. The sequence of modifications may thereby be applied to each photograph of the set, with certain changes limited to a subset of the photographs to which the changes are determined to be applicable by the software tool—e.g., red-eye removal may be applied only to those photographs in which the tool identifies one or more excessively reddened eyes. Despite the increased sophistication of digital media software, however, a batch-mode operation may sometimes fail to provide desired results or improvements to a digital media object; for example, the cumulative effect of the sequence of changes intended to improve a given original photograph of the set may actually result in the photograph appearing worse than the original to the user. Inspecting each digital media object included in a batch operation (especially a batch operation that potentially modifies hundreds or thousands of objects) after the entire sequence of requested modifications has been applied may not be a productive use of the user's time. It may be hard, for example, to determine exactly which of the requested modifications were actually applied to a given object, and which modifications led to the undesired results. It may also be nontrivial to undo some modifications on the given object while still retaining the effects of other modifications of the sequence.

SUMMARY

Various embodiments of systems and methods for incremental batch-mode editing of digital media objects are disclosed. According to one embodiment, a system includes one or more processors and memory coupled to the processors, where the memory stores program instructions executable by the processors to implement a media management tool. The media management tool is configured to receive a batch request indicating a plurality of modification operations to be performed on a plurality of digital media objects. Any of a variety of different types of digital media objects may be managed using the tool in different embodiments, including still images or photographs, audio objects, video objects, and the like. For each type of digital media object, any combination of applicable modification operations may be specified in the batch request: e.g., for photographs, the operations may include auto-orientation, red-eye removal, cropping, de-blurring, contrast changes, etc. The media management tool may be configured to perform the modification operations in a particular sequence. After a particular modification operation is performed, the media management tool may be configured to provide a representation of one or more digital media objects affected by the modification operation, and receive input or feedback pertaining to the modification operation. The input may, for example, indicate respective versions of one or more digital media objects on which the next modification operation in the particular sequence is to be performed. For example, out of a hundred photographs to which a batch request is to be applied, in one scenario only ten photographs may be changed during a particular modification operation. In such a situation, before the next modification operation, the media management tool may display only the ten changed photographs for review by a user. The user may indicate which of the ten modifications are acceptable, which changes if any are to be undone, and/or which objects need further corrective actions to be performed. Based on the feedback received from the user, the media management tool may assemble the set of versions of the hundred photographs on which the next modification operation is to be applied.

In some embodiments, after the media management tool applies each modification operation of the sequence, a representation of only those changes that correspond to the latest modification operation may be provided. The user may thus be allowed to provide a subjective evaluation of the effectiveness of the modifications applied thus far, without having to laboriously examine the entire set of digital media objects, some of which may not even have been affected by the latest modification. Especially in situations where large numbers (e.g., hundreds or thousands) of digital media objects may be targeted using a single batch modification request, such selective evaluation capabilities may save the user considerable time and effort. The media management tool may also utilize various techniques to minimize the number of input operations required for common or frequent actions: for example, a single click of a mouse may be sufficient to undo the effects of a particular modification operation in some embodiments. In some embodiments, when providing the representation of a set of changes to a user for review or approval, the media management tool may be configured to arrange the modified versions of the digital media objects in an order based on an expected likelihood of approval by the user.

In one embodiment, the media management tool may include "before" and "after" versions of one or more digital media objects in the representation provided to the user for review and evaluation. The user may be allowed to approve either the before version (in effect undoing the latest modification), the after version (in effect accepting the changes made by the media management tool during the latest modification), or another version derived in response to additional commands issued by the user. In some embodiments, the media management tool may be configured to change the order in which the modification operations indicated in the batch request are performed, e.g., in an effort to reduce the total amount of processing that may be required for the complete set of modification operations.

In another embodiment, the media management tool may be configured to only include changed portions of digital media objects in the representations provided to users for review; for example, if only a small part of a photograph is modified for red-eye removal, only the modified portion (or the modified portion together with some adjacent regions) may be displayed. Especially when dealing with large media objects and relatively small changes, such a technique may be helpful both in terms of reducing the amount of user effort required for review, and in reducing the processing overhead required to display the changes for each modification.

The media management tool may provide operation-specific customized or optimized interfaces for user feedback in some embodiments. For example, in one embodiment where the digital media objects include photographs, and one of the modification operations is an image orientation correction, the media management tool may determine a relative likelihood of correctness of the different possible orientations. A photograph may be displayed to the user in an orientation that the tool determines to be the most likely to be the correct orientation, and user feedback may then be received via an interface customized for orientation correction. The custom interface may help to minimize or reduce the total number of input operations or actions required from the user—e.g., a single click of a mouse may result in the orientation being changed to the next most likely orientation as determined by the tool. For a different modification operation, such as edge sharpening, the same input operation (e.g., a single mouse click) may be interpreted differently, e.g., as an undo or a repeat request.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
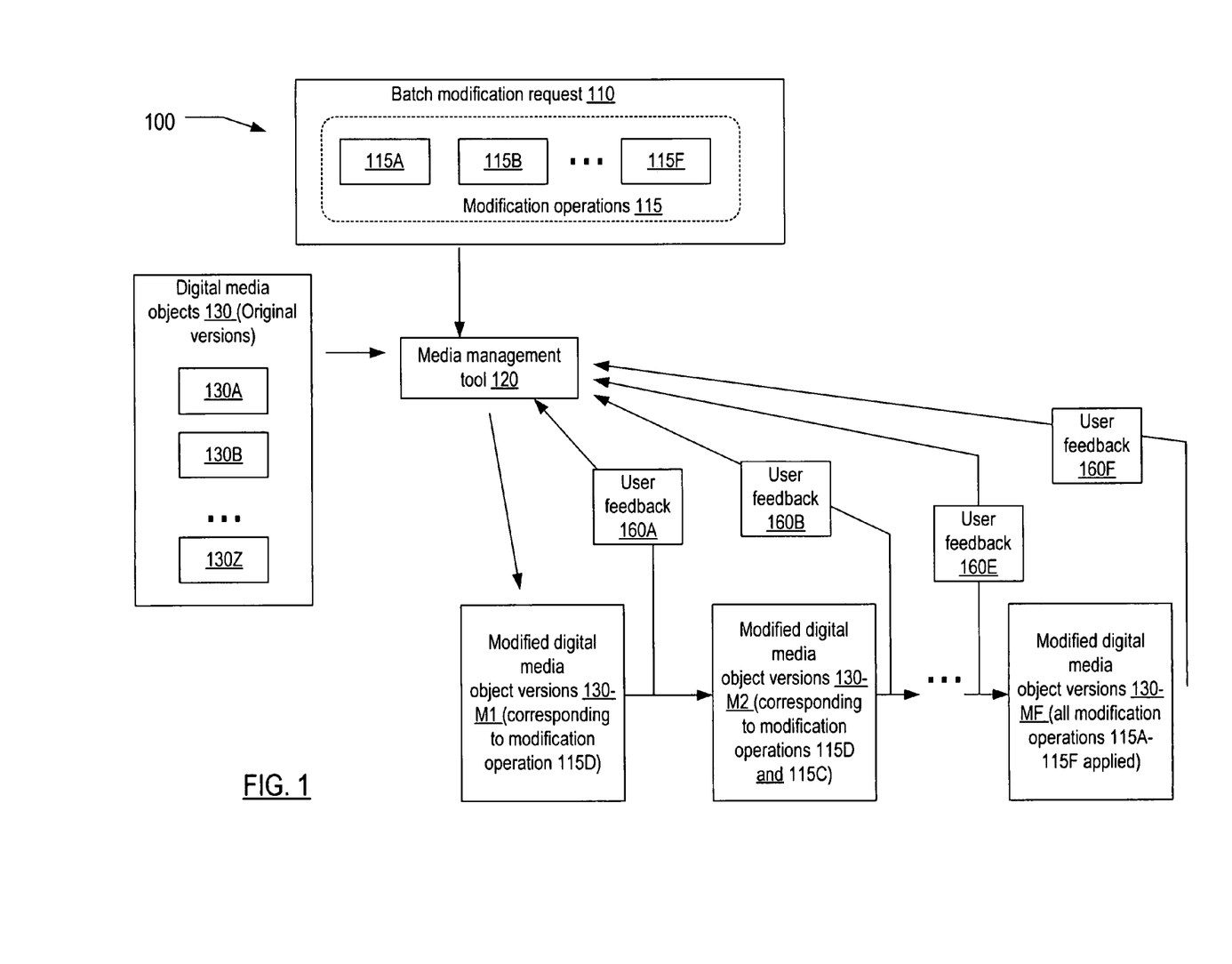
FIG. 1 is a block diagram illustrating one embodiment of a system.

FIG. 1 is a block diagram illustrating one embodiment of a system 100. The system includes a plurality of digital media objects 130 (e.g., objects 130A-130Z) and a media management tool 120. Digital media objects 130 may include, for example, files representing photographs (still images), audio, video (moving images), computer-generated graphics, and/or multiple forms of media (e.g., a combination of photographs, text commentary and audio in a single object) in various embodiments. The media management tool 120 may be used to perform a number of different types of operations on the digital media objects 130 in different embodiments, including batch operations to be performed on specified groups of the digital media objects 130 and/or single-object operations to be performed on individual digital media objects 130. In the depicted embodiment, the media management tool 120 may be configured to receive a batch modification request 110 indicating a plurality of modification operations 115 (e.g., 115A-115F) to be performed on a plurality of digital media objects 130, and perform the indicated modification operations in a particular order. Batch modification requests 110 may also be referred to herein simply as batch requests. The set of digital media objects 130 on which the modification operations 115 of batch modification request 110 are to be applied may be selected for batch processing based on a variety of different criteria in different embodiments—e.g., a set of photographs or videos taken on a vacation may be grouped together for batch processing, or a set of audio files representing a digitized version of an individual's record collection may be grouped together for batch processing.

Any combination of modification operations 115 applicable to the digital media objects 130 may be specified in the batch modification request 110 in various embodiments: e.g., in an embodiment where digital media objects 130 include still images, the modification operations may include auto-orientation, contrast changes, sharpening the images (which may also be termed "edge sharpening"), removing red-eye, cropping the images, adding customized borders, inserting digital watermarks or copyright information, de-blurring (e.g., removing blurring effects caused by camera motion or by less-than-optimal focusing), blurring (adding blurring effects), color correction, resolution changes, scaling, changes in dynamic range (the range of brightness levels in the photograph), and/or other user-defined actions. For audio objects, the modification operations may include removing hiss or noise, changing the default speed at which the audio is to be replayed, inserting specific sounds or background tunes, adjusting the relative loudness of different frequency ranges, etc. For video objects, the modification operations may include identifying and editing out poorly-shot portions of the video, adjusting lighting, modifying colors, synchronizing sounds with actions, etc. Additionally, some modification operations may apply to any type of digital media objects. For instance, media management tool 120 may be configured to allow a user to specify metadata or other information regarding, associating, or describing various digital media objects. In one embodiment a user may be able to specify keywords or textual tags to be associated with various digital media object, such as to associate a group of digital media objects. For example, a user may associate the text "Hawaii trip" with all the photos from a recent vacation. Similarly, a professional videographer may apply various keywords or other metadata to digital media objects to aid in future searches for video recordings.

In some embodiments, the media management tool 120 may be configured to change the order in which the operations 115 are performed; for example, the batch request 110 may specify the operations 115 in the order 115A, 115B, 115C, 115D, 115E, 115F but the media management tool 120 may perform the requested operations in a different order (e.g., 115D, 115C, 115E, 115B, 115A, 115F) based on one or more optimization criteria, heuristics, or other factors, as described below in further detail. The versions of the digital media objects 130 as they exist prior to any of the modification operations 115 being performed may be referred to herein as the "original versions" with respect to batch modification request 110.

Not all the digital media objects 130 may be affected by any given modification operation 115: for example, for a red-eye removal operation, the media management tool 120 may modify only those images in which it detects reddened eyes. After a particular modification operation 115 of the request 110 is performed, and before the next modification operation is performed, the media management tool 120 may be configured to provide a representation of one or more digital media objects 130 modified in the particular modification operation. In FIG. 1, for example, a set of digital media object versions 130-M1 changed during modification operation 115D may be displayed to a user before applying modification operation 115C. Similarly, a set of digital media object versions 130-M2 changed during operation 115C (and therefore representing cumulative changes made during operations 115D and 115C) may be displayed after operation 115C and before the next modification operation, and so on. It is noted that some of the changes applied during operation 115C in the illustrated example may be applied to original versions 130, while other changes corresponding to operation 115C may be applied to modified versions 130-M1, depending on the feedback 160A as described below. In one example scenario involving digital photograph media objects 130, if a batch request 110 is directed towards a set of a hundred digital photographs, and only ten of the hundred digital photographs are affected by a given operation 115, the media management tool 120 may be configured to highlight or display the modified versions of the ten photographs that were changed by the given operation, thus allowing a user to view the impact of one specific modification operation on a set of digital media objects at a time.

After providing the representation of the changes corresponding to a particular modification operation 115, the media management tool 120 may receive input (such as user feedback 160A in FIG. 1) pertaining to the particular modification operation, e.g., to indicate respective versions of one or more digital media objects on which the next modification operation 115 is to be performed (if any modification operations remain). For example, continuing the above example of a hundred photographs of which the ten that are modified during a specific modification operation 115 are displayed or highlighted, a user may provide input to approve, reject or further modify one or more of the ten modified photographs, and the input may be used by media management tool 120 to determine the set of versions of the hundred photographs on which the next operation 115 is to be applied. If all ten changed versions of the digital photographs are approved by the user, the set of digital photographs to which the next modification operation 115 is applied may include the ninety photograph versions that were not modified and the ten versions that were modified. If, in contrast, the input indicates that only six changed versions are approved, and that the latest changes to four of the photographs are to be undone, the next modification operation may be applied to ninety-four versions in which changes of the previous modification operation 115 are not included, and six versions in which the changes of the previous modification operation 115 are included.

As shown, in the embodiment depicted in FIG. 1, media management tool 120 may be configured to receive respective user feedback 160 (e.g., feedback 160A, 160B, ..., 160F) at various stages of operations corresponding to batch modification request 110, e.g., between each pair of modification operations 115 of the batch modification request 110 and after the last modification operation 115 has been performed. Thus, at each stage, the user may be allowed to provide a subjective evaluation of the effectiveness of the modifications applied thus far, without having to laboriously examine the entire set of digital media objects 130, some of which may not even have been affected by the latest modification. Especially in situations where large numbers (e.g., hundreds or thousands) of digital media objects 130 may be targeted using a single batch modification request 110, such selective evaluation capabilities may save the user considerable time and effort. In addition, as described below in further detail, media management tool 120 may also be configured to employ several additional techniques to reduce the amount of user effort required to evaluate and/or correct changes made to the digital media objects 130, e.g., by providing only changed portions of digital media objects 130 for user review instead of providing the entire objects, by providing customized input interfaces to reduce the number of user operations such as mouse clicks required to perform various corrective actions after a given modification operation, by presenting modified versions of digital media objects 130 to users in an order of estimated probability of acceptance, etc. It is noted that in some embodiments, two or more modification operations 115 may be performed before the next user input is received: e.g., in one embodiment, a user may identify the specific modification operations 115 after which the user is to provide feedback 160, and not all modification operations 115 may require feedback 160 from the user.

Figure 2:
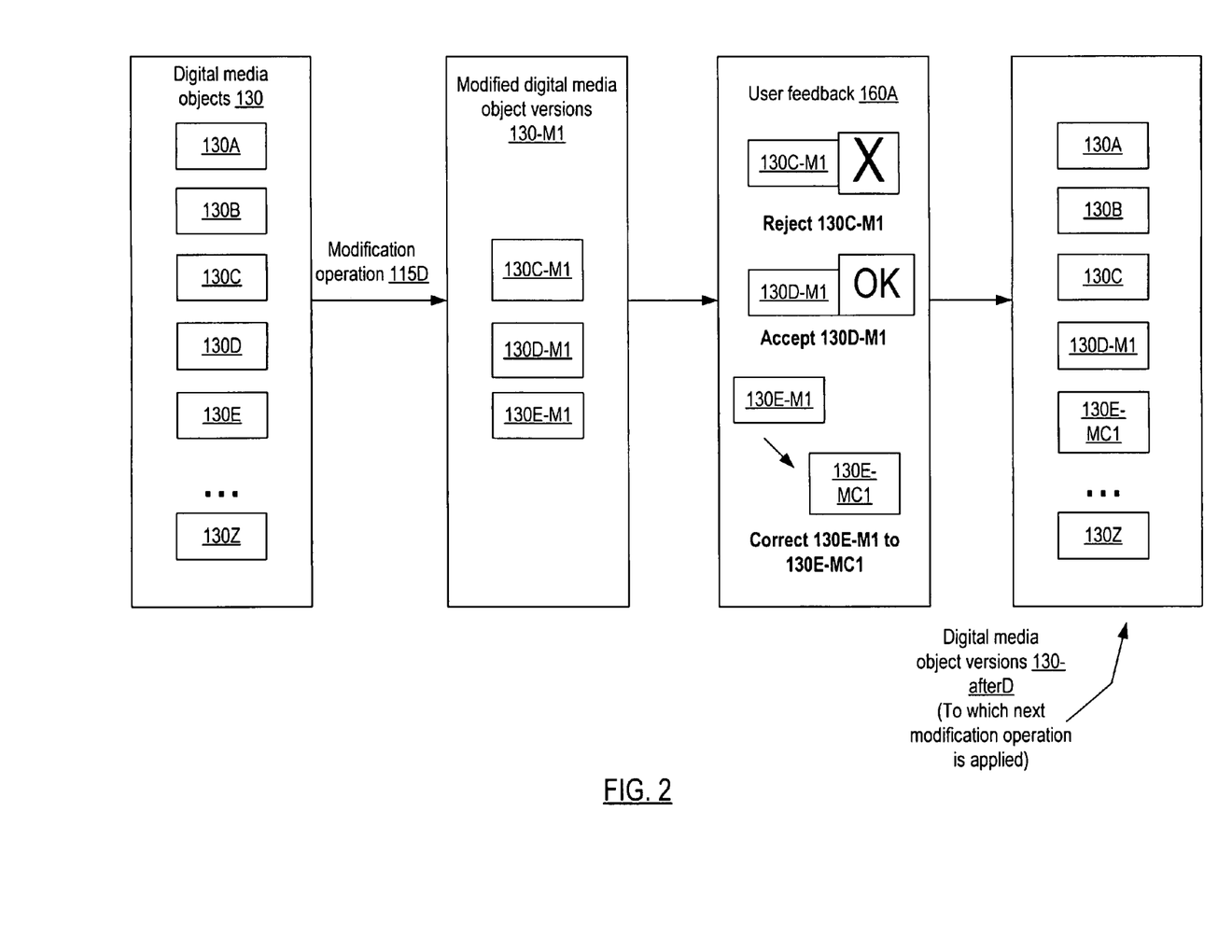
FIG. 2 is a block diagram illustrating an example scenario in which a user accepts a change made by a media management tool during a modification operation of a batch request, and rejects another change, according to one embodiment.

FIG. 2 is a block diagram illustrating an example scenario in which a user accepts a change made by media management tool 120 during a modification operation 115D of a batch request 110, and rejects another change, according to one embodiment. As shown, original versions 130A-130Z of the digital media objects may exist prior to the application of modification operation 115D in the depicted example. The modification operation 115D results in changes to three digital media objects: version 130C is modified to version 130C-M1, version 130D to version 130D-M1, and version 130E is changed to version 130E-M1. The modified versions 130-M1 may be presented to a user after modification operation 115D is performed and before the next modification operation of the batch request 110 is performed. In the depicted embodiment, the user feedback 160A comprises a different response to each of the modified versions 130A-Ml, 130B-M1, and 130E-M1.

As indicated by the "X" symbol, the user rejects the changes applied to generate version 130C-M1 in the example shown in FIG. 2. The user may reject changes to a digital media object based on any of a variety of factors in various embodiments: for example, the user may decide that the modification was not applicable or relevant to the previous version 130C, the media management tool 120 may have applied the modification incorrectly from the perspective of the user, and/or the changed version 130C-M1 may simply be considered worse by the user than the previous version 130C based on one or more other criteria. In some situations (as in the case of object 130E, described below in further detail), a user may be able to start with a version modified by media management tool 120 and perform one or more corrective actions or further modifications to improve the object; however, in the example illustrated in FIG. 2, the user has simply rejected the changes made to version 130C and has decided that the previous version 130C should instead be included in the set of versions of objects on which the next modification operation should be applied. Accordingly, modified version 130C-M1 has been excluded from the set of versions "130-afterD" to which the next modification operation is to be applied; instead, version 130C is included in the set 130-afterD. In some implementations, a single user input operation such as a mouse click may be all that is required from a user to undo the change made by the media management tool 120—e.g., a single mouse click may indicate that the current version is to be rejected and the previous version is to be accepted. A toggle interface may be provided in some embodiments, in which a first mouse click undoes the change, and a second mouse click redoes the change, so that the user may move back and forth between the two versions before selecting one as being acceptable.

As indicated by the "OK" symbol, the user has indicated in input included as part of feedback 160A that the changes made to data object 130D by media management tool 120 are acceptable. As a result, modified version 130D-M1 is included in the set 130-afterD. In some embodiments, a single user input operation such as a mouse click may suffice to approve a change. With respect to data object 130E, the user's input results in further changes or corrections to the modified version 130E-M1. That is, starting with the version 130E-M1 that was modified by the media management tool 120, the user has provided commands to apply additional modifications or corrections, leading to the generation of version 130E-MC1, which the user's input has indicated as being acceptable. Thus, instead of version 130E or 130E-M1, version 130E-MC1 is included in the set of versions 130-afterD to which the next modification operation is to be applied by media management tool 120.

In some embodiments, the interface to apply additional modifications or corrections may be customized, e.g., to reduce the effort required from a user, based on the type of modification operation that was most recently applied by the media management tool 120. For example, in an implementation where the digital media objects 130 comprise photographs, and the modification operation last performed is auto-orientation, the media management tool 120 may be configured to order the set of possible orientations of a photograph based on an estimated probability of correctness, and a single click on the changed version of the object may result in the orientation being changed to the next most likely orientation. As used herein, the term "auto-orientation" may refer to determining a most likely orientation for an image, video or other visual digital media object. For instance, media management tool 120 may be configured to analyze an image and/or apply one or more rules or heuristics to determine the image's most likely orientation. In some embodiments, media management tool 120 may analyze an image to detect one or more features or attributes present in the image that may aid in determining a most-likely orientation for the image. For example, in one embodiment, media management tool 120 may analyze images to detect a human face, an animal shape, the sky, a light source, or other features to determine a most-likely image orientation. As with other modification operations performed by media management tool 120, the user may provide feedback to orientation changes. For instance, media management tool 120 may be configured to display thumbnail views of images to allow the user to approve or modify the orientations determined by media management tool 120. In one embodiment, media management tool 120 may be configured to display thumbnails for all images for which the tool changed the orientation. In other embodiments, media management tool 120 may only display thumbnail views of those images for which the tool selected a particular orientation, such as vertical rather than horizontal. Thus, after an orientation change operation 115, a single click, such as on a thumbnail view for example, may represent the logical operation "change the orientation of the photograph to the next most probable orientation". In contrast, after a modification operation to sharpen an image, a single click may have a different meaning, such as "undo the sharpening"; thus the same input operation or command may have different interpretations depending on the type of modification being performed. Similarly, other input operations (such as pressing a particular function key) may have different customized results depending on the current modification operation in some embodiments.

Additionally, media management tool 120 may be configured to allow the user to approve the modified, or after, versions of multiple digital media objects with a single user input operation. For example, after an orientation change operation media management tool 120 may display thumbnail view of all images for which an orientation change was applied. Media management tool 120 may also be configured to accept user input for each thumbnail to modify the orientation of the corresponding digital media object. For instance, after the tool has display multiple thumbnail views corresponding to digital media objects for which an orientation change was applied, the user may click on a particular thumbnail and, in response, media management tool 120 may display the next most likely orientation for the particular digital media object. In some embodiments, media management tool 120 may be configured to allow the user may to select a single "OK" button to approve the orientations of all the digital media objects for which thumbnail views were displayed. If the thumbnail views for all the digital media objects for which a particular modification operation was applied (such as an orientation change) do not fit on a single user interface screen, media management tool 120 may display the thumbnail views on multiple successive user interface screens, allowing the user to approve of each screen of thumbnail views, according to one embodiment.

In one embodiment, the total number of digital media object versions that are modified during any given modification operation 115 may remain constant across the modification operations 115. E.g., if the original set of digital media objects 130 (i.e., the set as it existed before any of the modifications of batch request 110 were applied) included exactly 50 objects, the total number of versions of the objects that are modified in any given modification operation 115 may be restricted to 50, with exactly one version of a given digital media object being modified per operation 115. In other embodiments, a user may be permitted to include multiple versions of a given digital media object 130 in the set of versions to which the next modification operation 115 is to be applied: e.g., starting with 50 original digital media objects 130 on which a first modification operation is applied, the second modification operation may be applied to 55 total versions, the third to 62 versions, the fourth to 75 versions, and so on. In such embodiments, users may be allowed in effect to maintain a "version tree" for each digital media object 130, where each version tree includes one or more nodes representing respective versions of a given digital media object 130, and where the links between the nodes represent the modification operations that have been applied so far. Each modification operation may be applied, for example, to the current set of leaf nodes of each version tree (i.e., to the nodes representing the most recent modifications), generating new leaf nodes for versions that may be rejected, approved, or further modified by the user. A user may, for example, elect to retain multiple versions of a given digital media object 130 for further modification operations 115 in such embodiments if the user believes two versions to be equally acceptable, is unsure of the cumulative effects of further modification operations, and/or simply wishes to defer the decision of exactly which changes should be retained until more modification operations 115 have been applied. In other embodiments, the total number of digital media object 130 versions may decline between one modification operation 115 and another; e.g., a user may decide after viewing the results of a given modification operation 115 that a particular digital media object 130 is not worth retaining, and may discard the particular digital media object from the set to be considered for the remaining modification operations 115 of batch modification request 110.

Figure 3:
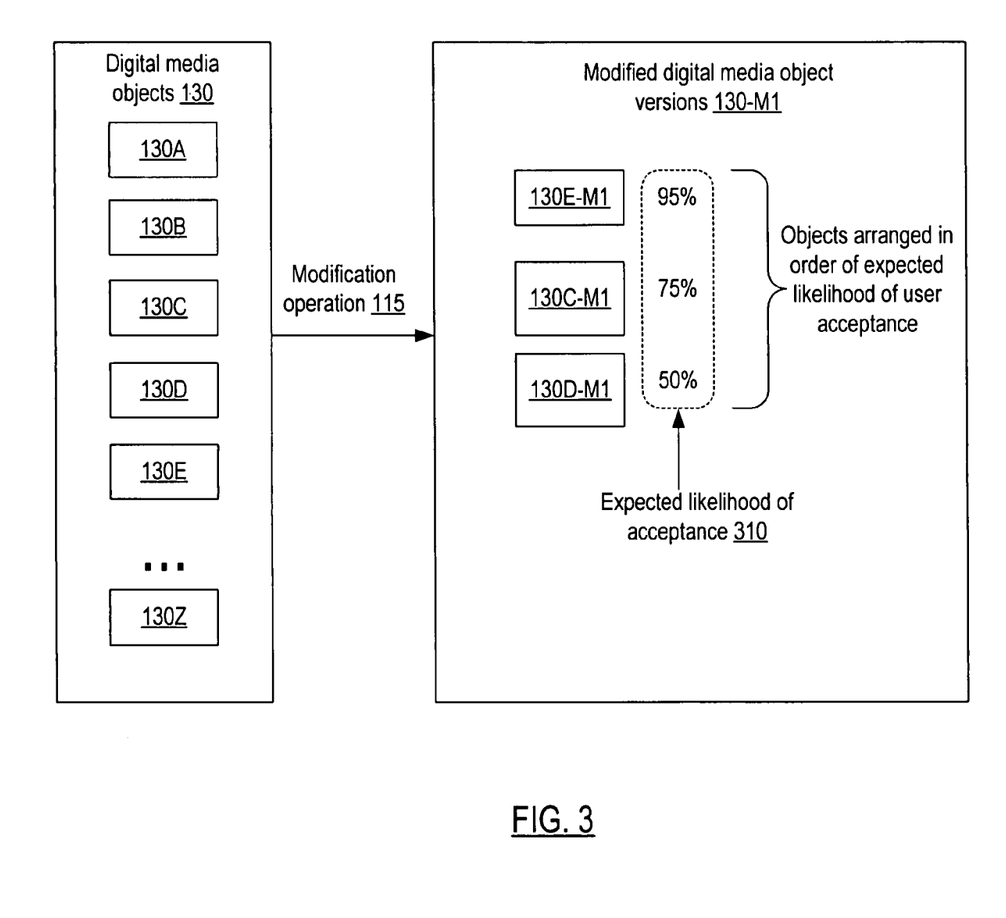
FIG. 3 is a block diagram illustrating an embodiment in which a media management tool is configured to arrange modified versions of digital media objects according to an expected likelihood of acceptance by the user when presenting the changes corresponding to a given modification operation.

FIG. 3 is a block diagram illustrating an embodiment in which media management tool 120 is configured to arrange modified versions of digital media objects 130 according to an expected likelihood of acceptance by the user when presenting the changes corresponding to a given modification operation 115. As shown, from among a set of digital media objects 130A-130Z, three digital media objects 130C, 130D, and 130E are changed during a modification operation 115. The changed versions of objects 130C, 130D and 130E are labeled 130C-M1, 130D-M1 and 130E-M1, respectively. The media management tool 120 may use any suitable rules or heuristics to estimate, for each of the modified versions, a likelihood that the user will find the modifications acceptable. For example, in embodiments where the digital media objects 130 include photographs and the operation being performed is an orientation change, the media management tool 120 may be configured to perform analysis on a modified version 130C-M1 to determine whether a region that appears to represent a part of the sky appears above another region that appears to represent the ground. Depending on the results of the analysis, the media management tool 120 may assign a probability of having a correct orientation to changed version 130C-M1, which may in turn represent the likelihood of the user's acceptance of the orientation change without requiring any further corrective action.

In the example scenario illustrated in FIG. 3, media management tool 120 has estimated the probability of the user's accepting version 130E-M1 as 95%, version 130C-M1 as 75%, and version 130D-M1 as 50%, respectively. Having estimated the probabilities 310 of acceptance, the media management tool 120 may arrange the changes versions in order of the probabilities 310—e.g., either in descending order of probabilities 310 as shown or in ascending order. By arranging the changed versions in order of likelihood of acceptance as shown, the media management tool 120 may further reduce the total amount of effort that may be required on the part of the user reviewing the changes, and may help the user to focus on reviewing the modifications where the user's input is more likely to be useful. For example, the user may decide to direct more of his/her attention on the modified versions to which the media management tool 120 has assigned a lower probability of acceptance. In some embodiments, the media management tool 120 may provide an indication of the estimated probability of acceptance to the user, e.g., by displaying the estimated probability next to each modified version, while in other embodiments, the probabilities may not be displayed to the user. In one embodiment, the feedback 160 provided by the user may be used by media management tool 120 to improve its ability to estimate the acceptability of modified versions: e.g., if the user rejects a large number of modified versions to which the tool 120 had assigned a high probability of acceptance (such as 90% or higher), the tool 120 may be configured to adapt the rules or heuristics it uses to more closely match the actual preferences of the user. In one implementation, the media management tool 120 may be configured to utilize user-specific information or application-specific information when estimating the likelihood of acceptance of modifications. For example, the requirements for acceptability for applications such as fashion photography may in some cases differ from the requirements for acceptability for family photographs. In one embodiment, media management tool 120 may allow users to indicate the type of application to which the digital media objects 130 are targeted, and use application-specific rules or heuristics in determining acceptance probabilities 310. In another embodiment, different digital media professionals such as photographers or musicians may each have their own "styles" or preferences with respect to acceptable modifications; media management tool 120 may be configured to save the preferences for different users and use the appropriate set of rules or heuristics based on the current user's preferences when determining acceptance probabilities 310.

Figure 4:
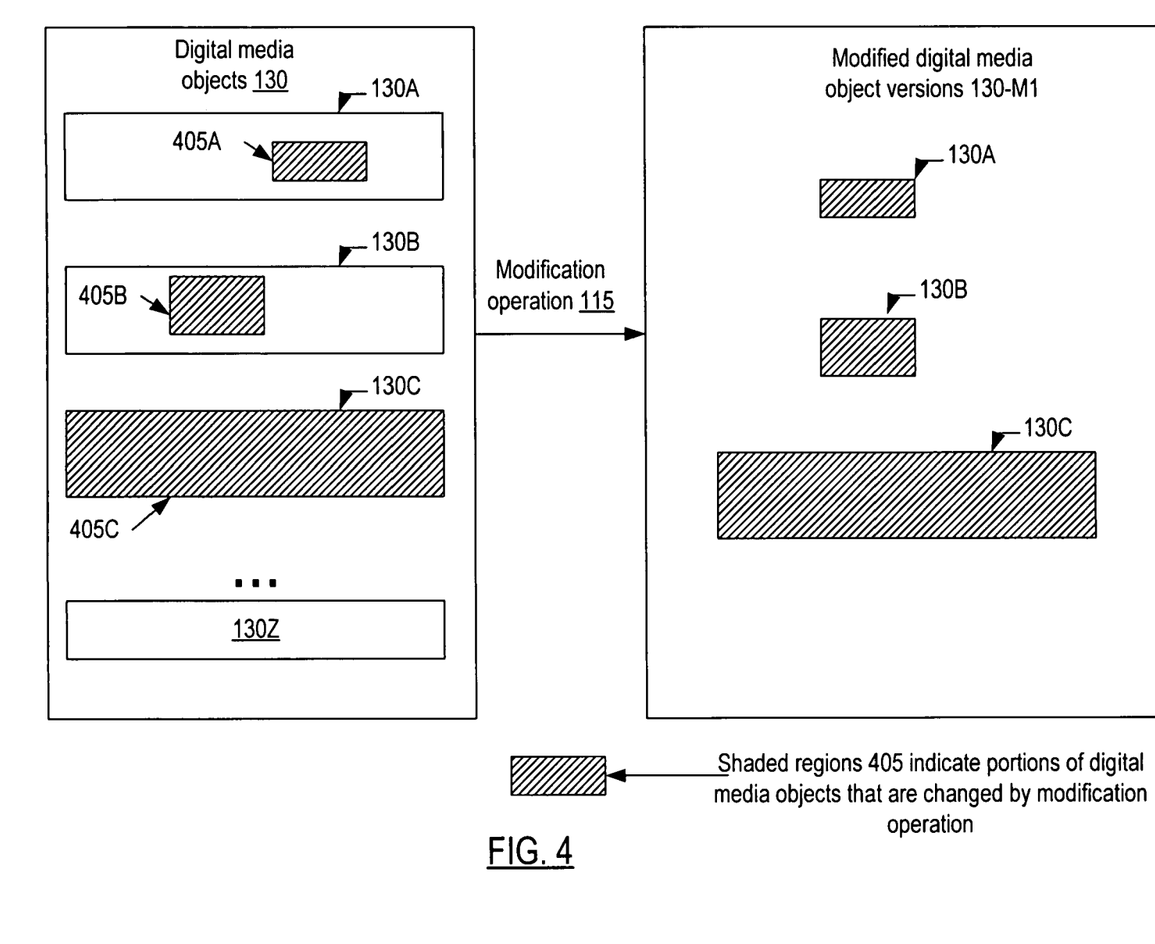
FIG. 4 illustrates an embodiment in which a media management tool may be configured to provide representations of only the changed portion or portions of a digital media object to a user for review and feedback.

FIG. 4 illustrates an embodiment in which the media management tool 120 may be configured to provide representations of only the changed portion or portions of a digital media object 130 to a user for review and feedback, e.g., instead of providing a representation of the full digital media object 130. Please note that FIG. 4 represents various portions of digital media object 130 as two-dimensional rectangles only for ease of illustration and discussion. In other embodiments, media management tool 120 may utilize and represent portions of image-based digital media objects as sub-images of various sizes and geometric shapes. Similarly, a portion of an audio-based digital media object may comprise an audio clip of the original digital media object. A portion of a video-based digital media object may include an audio clip, a subsection of successive images of the video media, or both. Thus, depending upon the nature of the particular digital media object, a portion may represent a subsection in space (e.g. a sub image), time (e.g. an audio clip) or both (e.g. a video clip representing only part of the original, full image size and a corresponding audio clip, both of which may be of shorter duration than the full video media). As shown in FIG. 4, modification operation 115 affects three digital media objects 130A, 130B and 130C in the depicted example. In the cases of objects 130A and 130B; only a portion of the object is modified as a result of the operation 115: e.g., shaded portion 405A is modified in object 130A, shaded portion 405B is modified in object 130B. In contrast, all of object 130C (indicated by shaded region 405C) is modified in the illustrated example. The media management tool 120 may be configured to include only the changed portions of each modified digital media object 130 in the representation provided to a user: e.g., as shown, the portions corresponding to the shaded regions 405A, 405B and 405C may be provided. By providing representations of only the changed portions of objects 130, the media management tool 120 may also help to reduce the effort and time needed by the user to judge the effectiveness of the changes made by the tool, especially in scenarios when the digital media objects are large (e.g., several megabytes for still images, or even gigabytes in the case of video images) and only a relatively small fraction of the digital media object 130 is changed (e.g., to perform red-eye removal on photographs, or to enhance brightness in an excessively dark portion of a video).

In some embodiments, when providing changed portions of digital media objects 130 to users for review, the media management tool 120 may be configured to include at least some surrounding context (e.g., unchanged portions of the digital media objects that are adjacent to the changed portions). For example, if a region of 200×200 pixels is modified within a photograph, the media management tool 120 may display the modified region together with a 50 pixel border on all sides, thus displaying a total area of 300×300 pixels instead of just the changed region. The width of the border may be determined based on configurable parameters or preferences in some embodiments. In another embodiment where the media management tool 120 is configured to show only portions of digital media objects 130 rather than the entire objects, the tool 120 may provide one or more custom interfaces allowing a user to quickly obtain additional context—e.g., in response to a single mouse click on a changed portion of a photograph, the user may be provided a larger portion of the changed photograph or the entire changed photograph. In one implementation, successive mouse clicks may be used to gradually zoom out of the changed portion into the surrounding portions of the digital media object. In one embodiment, the entire changed version of the digital media object 130 may be provided to the user together with a simple interface to zoom in on (or highlight) the changed regions: e.g., a single mouse click on the changed version of the entire object may result in the unchanged portions being removed from the representation, or in highlighting only the changed portions using a border or some other mechanism. In other embodiments, users may be provided controls (such as preference settings) to indicate whether they wish to view only changed portions 405 of digital media objects 130 or the entire objects.

Figure 5:
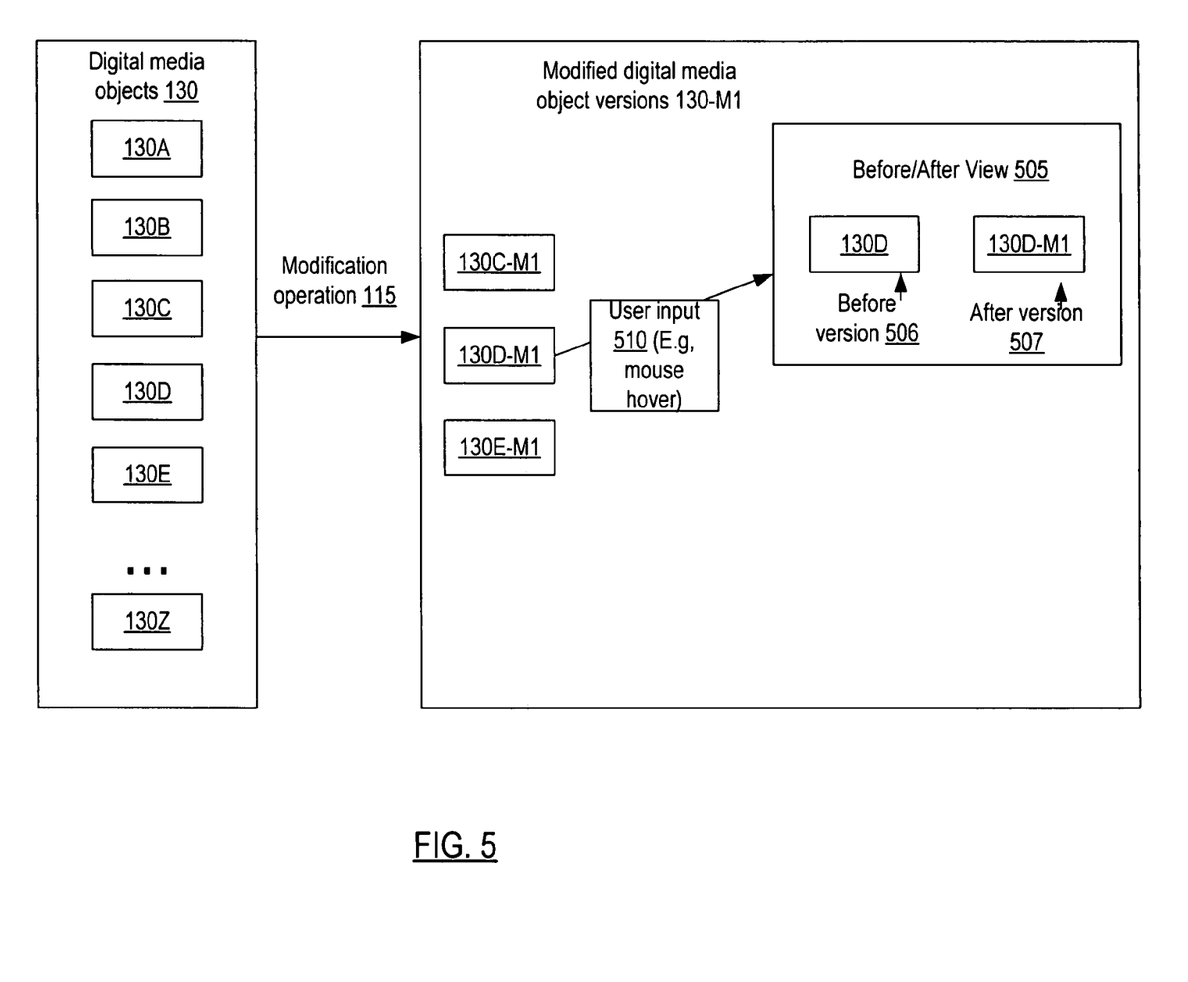
FIG. 5 is a block diagram illustrating an embodiment in which a media management tool may be configured to provide a "before" version and an "after" version corresponding to a modification of a digital media object.

FIG. 5 is a block diagram illustrating an embodiment in which media management tool 120 may be configured to provide a "before" version and an "after" version corresponding to a modification of a digital media object 130. As shown, a modification operation 115 may result in changes to three digital media objects in the illustrated example scenario: object 130C is modified to version 130C-M1, object 130D is modified to version 130D-M1, and object 130E is modified to version 130E-M1. The media management tool 120 may include the changed versions 130C-M1, 130D-M1 and 130E-M1 of the modified objects in a default representation provided to the user. In response to input 510 (such as a mouse hover or a single mouse click) received from the user specifying a particular changed version (130D-M1 in the illustrated example), the media management tool 120 may be configured to provide a "before/after" view 505 of the specified object. The before/after view 505 may include the "before" version 506 (e.g., the version 130D as it existed before the modification 115 was applied) and the "after" version 507 (i.e., the modified version 130D-M1) arranged in such a way that the user may easily identify the changes that were made. In some embodiments, the changed portions of the objects may be highlighted within the before/after view 505, further simplifying the task of the user in determining exactly what changed between the two versions.

In some embodiments, the media management tool 120 may provide additional functionality related to before and after versions of changed digital media objects. For example, in one embodiment, a single user input operation such as a mouse click anywhere within a region enclosing a set of changed versions 130-M1 may result in a display of before and after versions for each of the elements of the set, thus allowing the user to perform side-by-side comparisons for a plurality of objects without having to request the before and after versions individually for each object. In one implementation, a toggle interface may allow the user to switch back and forth between the before version 506 and the after version 507 before eventually selecting one of the versions as being acceptable. In some embodiments, a default view of the changed objects 130-M1 may show before and after versions, i.e., user input 305 may not be required for the before and after versions to be displayed.

Figure 6:
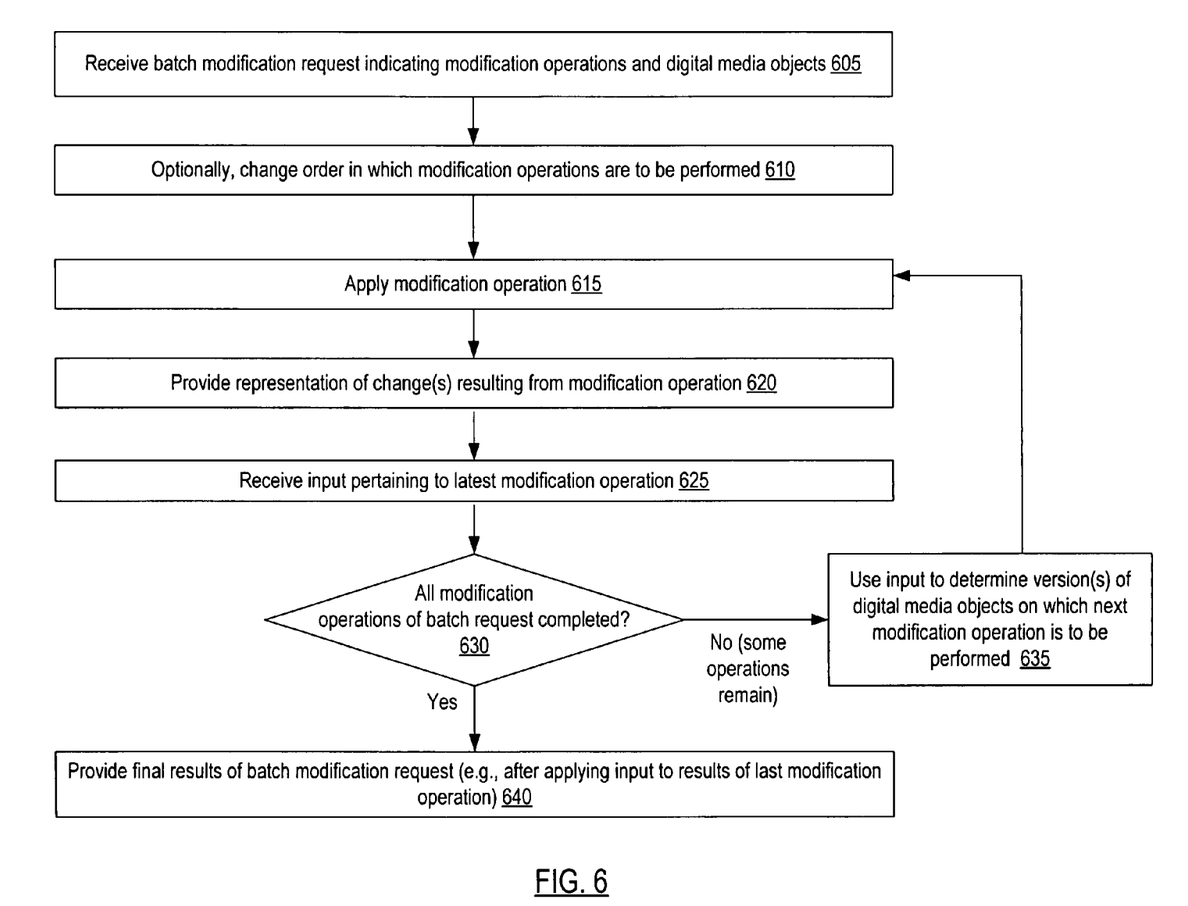
FIG. 6 is a flow diagram illustrating aspects of the operation of a media management tool, according to one embodiment.

FIG. 6 is a flow diagram illustrating aspects of the operation of media management tool 120, according to one embodiment. As shown in block 605, the media management tool 120 may be configured to receive a batch modification request 110 that specifies a set of modification operations 115 to be applied to a set of digital media objects 130. In some embodiments, the media management tool 120 may be configured to change the order in which modification operations 115 are applied from the original order in which the operations are specified in the batch modification request 110 (block 610). For example, in one scenario where the digital media objects 130 represent photographs, the modification operations 115 as originally specified may include an image sharpening operation followed by a cropping operation. In one embodiment the media management tool 120 may change the order of the operations 115 in this example to perform cropping before image sharpening, since performing the cropping first may reduce the sizes of the photographs and may thus reduce the total amount of sharpening-related processing to be performed. Criteria other than processing reduction may be used to reorder modification operations 115 in other embodiments.

The media management tool 120 may apply each of the modification operations in turn, either in the original order specified in the batch request or in a different order than the original order. After a particular modification operation 115 is performed (block 615), the media management tool 115 may be configured to provide a representation of the changes made (block 620). In some cases the modification operation 115 may have changed only a subset of the digital media objects 130; in such cases, only the changed versions of the digital media objects may be presented to the user, instead of for example presenting the entire set of digital media objects. As noted above, the representation may be organized using a variety of techniques in different embodiments: e.g., in one embodiment, only the changed portion or portions of a given digital media object may be presented, in another embodiment the changed versions of the objects may be arranged in order of an estimated probability of acceptance by the user, and in a different embodiment, the representation may include before and after versions of digital media objects 130. Additionally, in some embodiments, media management tool 115 may be configured to organize the representation of the changes made using multiple techniques simultaneously. For example, media management tool 115 may display before and after versions of the changed portion or portions of digital media objects while simultaneously ordering the media objects based on an estimated probability of acceptance. In some embodiments, media management tool 115 may be configured to allow the user to select or specify the manner or techniques used to present changes to digital media objects.

In response to the representation of the changes made as part of the modification operation 115, the media management tool 115 may receive input pertaining to the latest modification operation from the user (block 625). The input, which may be provided using any of a variety of interfaces such as a mouse, a keyboard, a joystick, controls of a media player, etc., in different embodiments, may indicate the user's feedback 160 to the changes. For example, the user may accept some or all of the changes made by the media management tool 120, reject or undo other changes, and/or apply further modifications or corrections to the versions modified by the media management tool 120. In some embodiments, the user's input may be applied to the changed versions of the digital media objects after all the modification operations specified in the batch modification request 110 have been completed (as detected in block 630). In other words, the user's input may be applied to the latest changed versions of the digital media objects to provide the final results of the batch modification request (for example, one or more corrections may be applied based on the user's feedback after the tool has applied the last modification operation). In other embodiments however, the user's input may be applied to each digital media object during the modification process. For example, the user's feedback may be applied to digital media objects after an individual modification operation performed by the media management tool 115. In general, media management tool 115 may be configured to apply the user's input and/or feedback after completing any individual modification operation or after completing all modification operations, according to different embodiments.

If some modification operations 115 have not yet been applied (as also detected in block 630), the media management tool 120 may be configured to determine, using the input provided by the user, the set of versions of the digital media objects on which the next modification operation 115 is to be performed (block 635). For example, the changed versions of the digital media objects that were found acceptable by the user may be included in the set, while the previous versions (i.e., the versions that do not include the effects of the latest modification operation 115) may be included for those objects whose changes were rejected or undone via the user's input. The operations corresponding to blocks 615, 620, 625, 630 and 635 may then be repeated for each modification operation 115 in turn until all the operations 115 have been completed.

Figure 7:
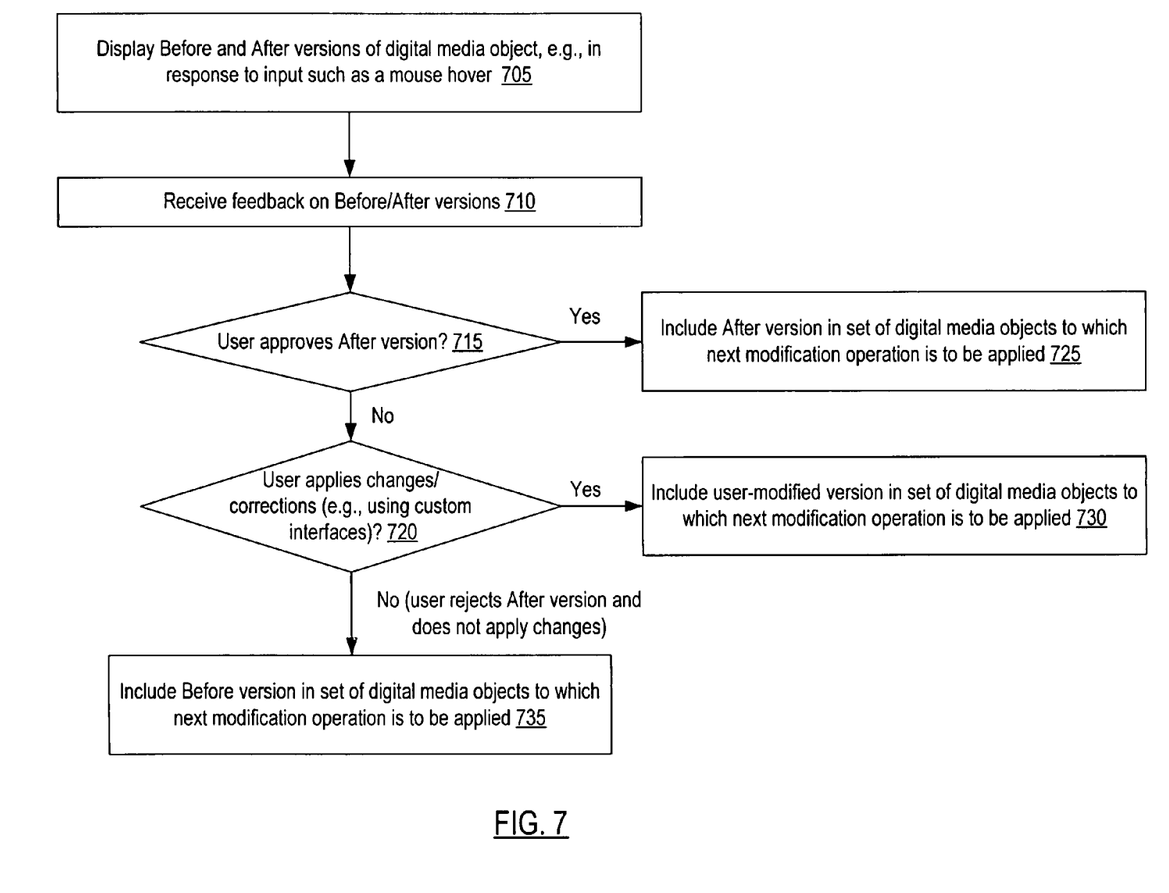
FIG. 7 is a flow diagram illustrating further aspects of the operation of a media management tool in an embodiment where a user may review "before" and "after" versions of a digital media object for a given modification operation.

FIG. 7 is a flow diagram illustrating further aspects of the operation of media management tool 120 in an embodiment where a user may review "before" and "after" versions of a digital media object 130 for a given modification operation 115. The "after" version may represent the changes performed on a digital media object 130 by the media modification tool 115 in the latest modification operation 115, while the "before" version may represent the state of the object prior to the latest modification operation 115. In the depicted embodiment, the media management tool 120 is configured to display the before and after versions of one or more digital media objects, for example in response to input such as a mouse hover over an icon representing the digital media object, a mouse click, a depression of a function key, or the like (block 705). In one embodiment, the media management tool 120 may be configured to automatically display the before and after versions of digital media objects as a default view without requiring any specific input from the user. After the before and after versions are displayed, the media management tool 120 may receive feedback from the user (block 710), which may also be provided using any of a number of different interfaces such as a mouse or keyboard. If the feedback indicates that the user finds the after version acceptable (as detected in block 715), the media management tool 120 may include the after version in the set of versions on which the next modification operation is to be performed (block 725). If the user's feedback includes requests for additional changes/corrections to be applied to the after image (as detected in block 720), e.g., using interfaces customized for the specific modification operation just performed, the additional changes may be applied and the user-modified version may be included in the set to which the next modification operation is applied (block 730). If the user rejects the after version and also does not indicate any further changes, the before version may be included in the set on which the next modification operation 115 is performed (block 735). In some embodiments, the before version may be included in the set in response to an explicit undo request.

Figure 8:
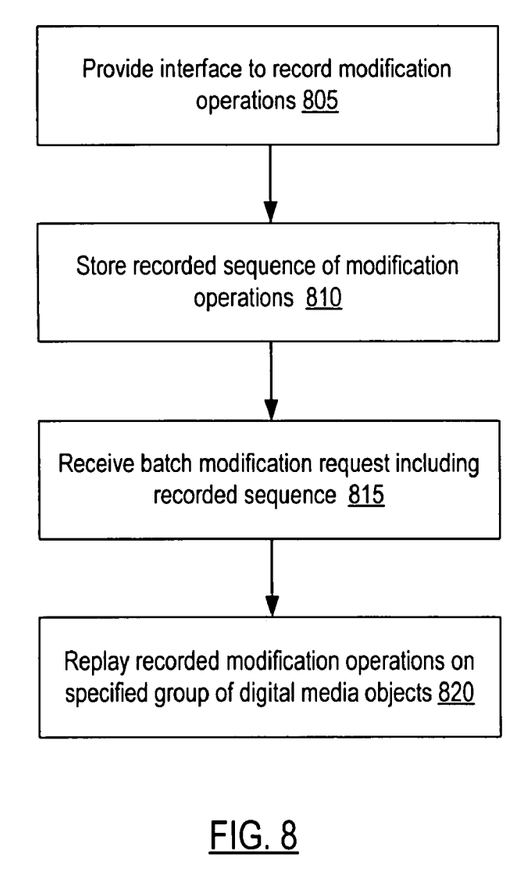
FIG. 8 is a flow diagram illustrating aspects of the operation of a media management tool according to an embodiment in which batch modification requests may be prepared using a recording of a sequence of modifications.

FIG. 8 is a flow diagram illustrating aspects of the operation of media management tool 120 according to an embodiment in which batch modification requests 110 may be prepared using a recording of a sequence of modifications. As shown in block 805, the media management tool 120 may provide an interface to support recording of user actions such as modification operations. A user may record a sequence of operations performed on a single digital media object 130 using the interface, and the media management tool 120 may store the recorded sequence (block 810). Any suitable format may be used to store the recorded operations in different embodiments; for example, a proprietary event encoding technique may be utilized in one embodiment, while a general purpose programming language or high-level scripting language may be used in other embodiments. The recorded sequence may be used to generate the batch modification request 110, e.g., by removing references to the specific digital media object that was modified during recording and retaining the information identifying the operations that were performed. In some embodiments the media management tool may be configured to generate a visual representation of the sequence of recorded operations, e.g., using different icons to illustrate the different types of operations recorded, and the user may be allowed to manipulate the visual representation (e.g., delete some operations, replicate others, insert pauses or other operations, or reorder the operations) before using the recording for a batch modification request 110. A batch modification request 110 received by the media modification tool may include a stored recording of a sequence of modification operations (or a reference to a stored recording) (block 815) and a specification of the digital media objects 130 on which the operations are to be performed. The media management tool 120 may in effect replay the recorded operations on the specified group of digital media objects 130 in response to the batch modification request 110 (block 820), receiving user input after some or all of the modification operations 115 as described above.

Figure 9:
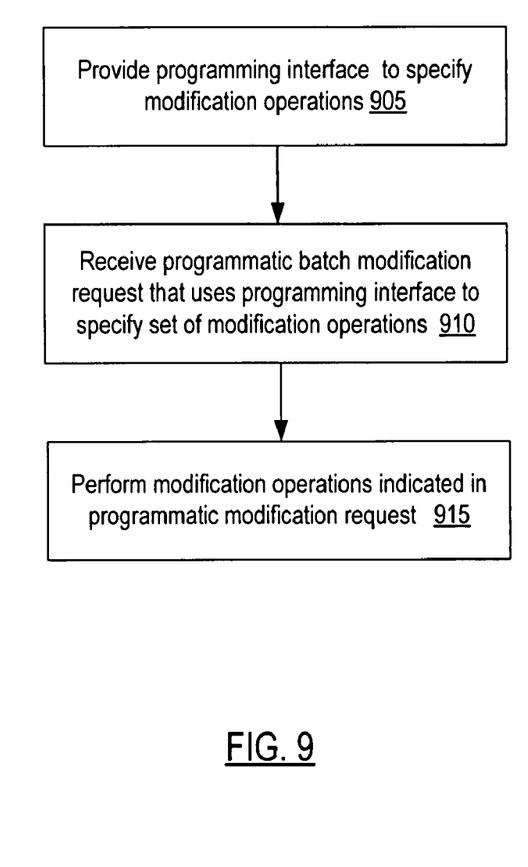
FIG. 9 is a flow diagram illustrating aspects of the operation of a media management tool according to one embodiment in which batch modification requests are generated using a programming interface provided by the tool.

In some embodiments, instead of or in addition to using recordings to generate batch modification requests 110, other techniques may be used. FIG. 9 is a flow diagram illustrating aspects of the operation of media management tool 120 according to one embodiment in which batch modification requests are generated using a programming interface provided by the tool. As shown in block 905, the media management tool 120 may provide support for a programming interface to specify modification operations. The programming interface may be text-based in some embodiments (i.e., the user may have to type in the code, such as method or function calls, corresponding to each desired modification operation) and graphical (i.e., different icons or glyphs may represent different modification operations) in other embodiments. The media management tool 120 may receive a programmatic batch modification request that specifies a set of desired modification operations using the programming interface (block 910), and may then perform the specified operations (block 915), receiving user input at various stages as described above. In some embodiments, a combination of a programming interface and a recording may be used: e.g., a recording may be generated first, and then additional operations may be inserted into the recording using the programming interface, or a programmatic sequence of operations may be generated first and then enhanced using a recording. In some embodiments, representations of batch requests 110 may be retained, e.g., in the form of scripts on persistent storage, and may be reused as needed on different sets of digital media objects 130.

Figure 10:
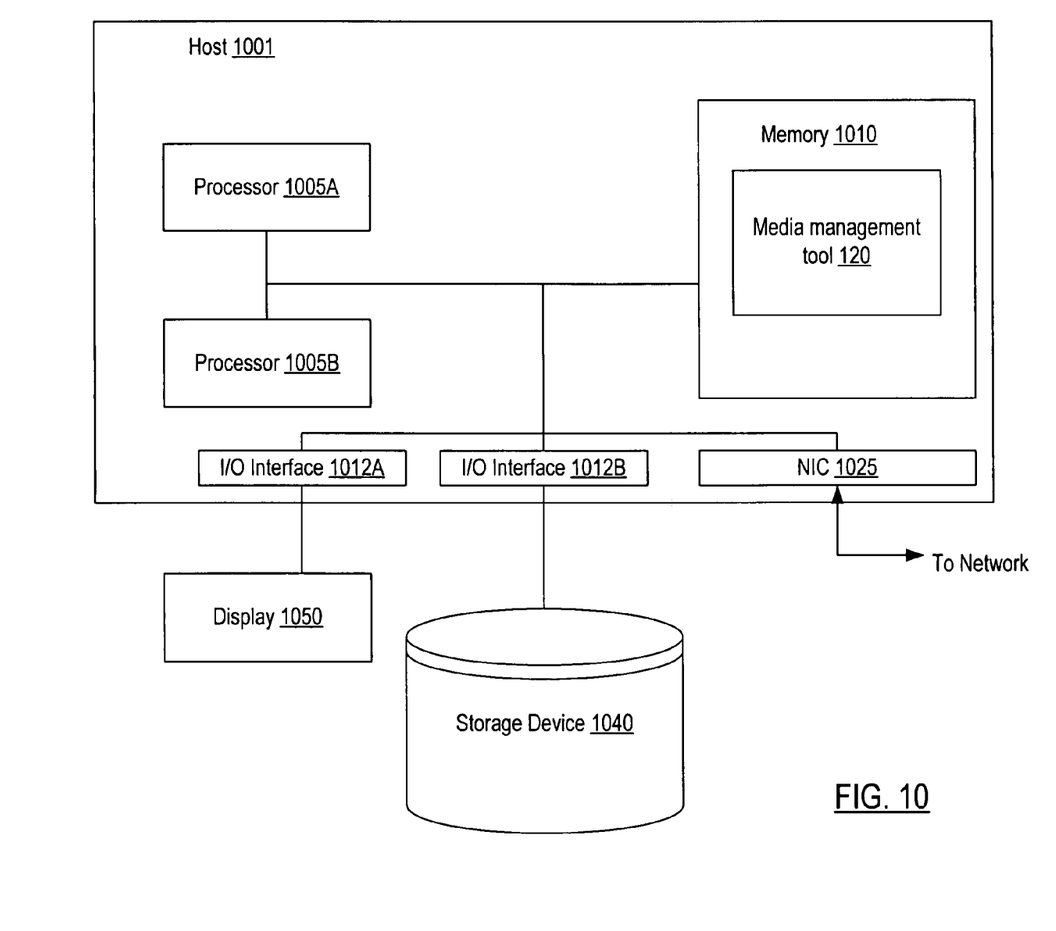
FIG. 10 is a block diagram illustrating constituent elements of a computer host, according to one embodiment.

FIG. 10 is a block diagram illustrating constituent elements of a computer host 1001 at which at least a portion of the media management tool 120 may be executed, according to one embodiment. Host 1001 may include one or more processors 1005 (e.g., 1005A and 1005B) implemented using any desired architecture or chip set, such as the SPARC™ architecture, an x86-compatible architecture from Intel Corporation, Advanced Micro Devices, or another architecture or chipset capable of processing data. Any desired operating system may be run on the host 1001, such as various versions of Unix, Linux, Windows™ from Microsoft Corporation, MacOS from Apple Corporation, or any other operating system that enables the operation of software on a hardware platform. Program instructions that may be executable to implement the functionality of the media management tool 120 described above may be partly or fully resident within a memory 1020 at the host 1001 at any given point in time, and may also be stored on a storage device 1040 such as a disk or disk array accessible from the processors.

In various embodiments, media management tool 120 may be packaged as a standalone application, or may be packaged along with a suite of other software tools. In some embodiments, different media management tools 120 may be used for each type of digital media object 130: e.g., one tool may be used for still images or photographs, another for audio files, and another for video files; in other embodiments, a single media management tool 120 may be used to modify a variety of different types of digital media objects 130. The memory 1020 used to store the program instructions may be implemented using any appropriate medium such as any of various types of RAM (e.g., DRAM, SDRAM, RDRAM, SRAM, etc.). In addition to processors and memory, the host 1001 may also include one or more I/O interfaces 1012, such as I/O interface 1012A providing access to storage devices 1040 and I/O interface 1012B providing access to a display 1050 which may be used to provide the representations of the changed digital media objects to users. In addition, host 1001 may include one or more network interfaces 1014 providing access to a network. Any of a variety of storage devices 1040 may be used to store the program instructions as well as the various versions of digital media objects 130 in different embodiments, including any desired type of persistent and/or volatile storage devices, such as individual disks, disk arrays, optical devices such as CD-ROMs, CD-RW drives, DVD-ROMs, DVD-RW drives, flash memory devices, various types of RAM, holographic storage and the like. It should be noted that one or more components of host 1001 may be located remotely and accessed via a network. Media management tool 120 may be implemented in various embodiments using any desired programming language, scripting language, or combination of programming languages and/or scripting languages, e.g., C, C++, C#, Java™, Perl, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   one or more processors;
   memory coupled to the one or more processors, wherein the memory is configured to store program instructions executable by the one or more processors to implement a media management tool configured to:
      receive a batch request indicating a plurality of modification operations to be performed on a plurality of digital media objects; and
      perform the plurality of modification operations in a particular order;
   wherein, after a particular modification operation is performed and before the next modification operation in the particular order is performed, the media management tool is further configured to:
      provide a representation of one or more digital media objects modified in the particular modification operation; and
      receive input pertaining to the particular modification operation to indicate a respective version of each of one or more digital media objects on which the next modification operation is to be performed.

2. The system as recited in claim 1, wherein the media management tool is further configured to:
   identify a subset of the plurality of digital media objects on which the particular modification operation is to be performed, wherein the subset excludes at least one digital media object of the plurality of digital media objects;
   wherein the representation includes the subset and excludes the at least one digital media object.

3. The system as recited in claim 1, wherein the representation comprises a representation of a portion of a particular digital media object modified by the particular modification operation, and excludes another portion of the particular digital media object that is unaffected by the particular modification operation.

4. The system as recited in claim 1, wherein the representation comprises a before version and an after version of the particular digital media object, wherein the before version represents a state of the particular digital media object before the particular modification operation is applied to the particular digital media object, and the after version represents a state of the particular digital media object after the particular modification operation is applied.

5. The system as recited in claim 1, wherein the batch request comprises an indication of an originally-specified order of the plurality of modification operations, and wherein the media management tool is configured to change the order in which the modification operations are performed from the originally-specified order to the particular order.

6. The system as recited in claim 1, wherein a respective version indicated by the input includes a version of a particular digital media object modified in the particular modification operation.

7. The system as recited in claim 1, wherein a respective version indicated by the input includes a version of a particular digital media object that excludes one or more changes to the particular digital media object performed in the particular modification operation.

8. The system as recited in claim 1, wherein a respective version indicated by the input include a version of a particular digital media object that includes one or more changes applied to the particular digital media object in response to a command received after the particular modification operation is performed.

9. The system as recited in claim 1, wherein the media management tool is further configured to provide a first input interface customized for receiving input pertaining to the particular modification operation, and a second input interface customized for receiving input pertaining to the next modification operation, wherein the first input interface differs from the second input interface.

10. The system as recited in claim 1, wherein the input pertaining to the particular modification operation is received via a single user input operation.

11. The system as recited in claim 10, wherein the single user input operation includes exactly one click of a mouse interface.

12. The system as recited in claim 1, wherein the particular modification operation results in changes to two or more digital media objects of the plurality of digital media objects, wherein the representation comprises a respective changed version of each of the two or more digital media objects arranged in an order based at least in part on a respective estimated probability of acceptance of each of the changed versions by a user without requiring further changes.

13. The system of claim 1, wherein the particular modification operation results in changes to two or more digital media objects of the plurality of digital media objects, wherein the media management tool is configured to provide the representation on multiple, successive user interface screens if the respective changed versions of each of the two or more digital media objects do not fit on a single user interface screen.

14. The system as recited in claim 1, wherein the plurality of digital media objects includes one or more still images.

15. The system as recited in claim 14, wherein the plurality of modification operations includes one or more of: a red-eye correction, a blurring, a de-blurring, a color correction, a cropping, a contrast change, a change in resolution, an edge sharpening, a scaling, a change in dynamic range, and a user-defined action.

16. The system as recited in claim 14, wherein one of the plurality of modification operations includes auto-orientation for each of one or more of the digital media objects, wherein the representation of one or more digital media objects includes a thumbnail view of each of the modified one or more digital media objects, and wherein each thumbnail view represents a most-likely orientation for the corresponding digital media object.

17. The system as recited in claim 16, wherein the input pertaining to the particular modification operation includes a single mouse click to one of the thumbnail views, wherein in response to the single mouse click the media management tool is configured to:
  determine a next most-likely orientation for a digital media object corresponding to the clicked thumbnail view; and
  display a thumbnail view representing the next most-likely orientation of the corresponding digital media object.

18. The system as recited in claim 1, wherein the plurality of digital media objects includes at least one video object.

19. The system as recited in claim 1, wherein the plurality of digital media objects includes at least one audio object.

20. A computer-readable storage medium, comprising program instructions, wherein the instructions are computer-executable to implement a media management tool configured to:
  receive a batch request indicating a plurality of modification operations to be performed on a plurality of digital media objects; and
  perform the plurality of modification operations in a particular order;
  wherein, after a particular modification operation is performed and before the next modification operation in the particular order is performed, the media management tool is further configured to:
    provide a representation of one or more digital media objects modified in the particular modification operation; and
    receive input pertaining to the particular modification operation to indicate a respective versions of each of one or more digital media objects on which the next modification operation is to be performed.

21. The storage medium as recited in claim 20, wherein the media management tool is further configured to:
  identify a subset of the plurality of digital media objects on which the particular modification operation is to be performed, wherein the subset excludes at least one digital media object of the plurality of digital media objects;
  wherein the representation includes the subset and excludes the at least one digital media object.

22. The storage medium as recited in claim 20, wherein the representation comprises a before version and an after version of a particular digital media object, wherein the before version represents a state of the particular digital media object before the particular modification operation is applied to the particular digital media object, and the after version represents a state of the particular digital media object after the particular modification operation is applied.

23. The storage medium as recited in claim 20, wherein a respective version indicated by the input includes a version of a particular digital media object modified in the particular modification operation.

24. The storage medium as recited in claim 20, wherein a respective version indicated by the input includes a version of a particular digital media object that excludes one or more changes to the particular digital media object performed in the particular modification operation.

25. The storage medium as recited in claim 20, wherein a respective version indicated by the input includes a version of a particular digital media object that includes one or more changes applied to the particular digital media object in response to a command received after the particular modification operation is performed.

26. A computer-implemented method, comprising:
receiving a batch request indicating a plurality of modification operations to be performed on a plurality of digital media objects; and
performing the plurality of modification operations in a particular order;
wherein said performing the plurality of modification operations in the particular order comprises:
after a particular modification operation is performed and before the next modification operation in the particular order is performed,
providing a representation of one or more digital media objects modified in the particular modification operation; and
receiving input pertaining to the particular modification operation to indicate a respective version of each of one or more digital media objects on which the next modification operation is to be performed.

27. The method as recited in claim 26, further comprising:
identifying a subset of the plurality of digital media objects on which the particular modification operation is to be performed, wherein the subset excludes at least one digital media object of the plurality of digital media objects;
wherein the representation includes the subset and excludes the at least one digital media object.

28. The method as recited in claim 26, wherein the representation comprises a before version and an after version of a particular digital media object, wherein the before version represents a state of the particular digital media object before the particular modification operation is applied to the particular digital media object, and the after version represents a state of the particular digital media object after the particular modification operation is applied.

29. The method as recited in claim 26, wherein a respective version indicated by the input includes a version of a particular digital media object modified in the particular modification operation.

30. The method as recited in claim 26, wherein a respective version indicated by the input includes a version of a particular digital media object that excludes one or more changes to the particular digital media object performed in the particular modification operation.

31. The method as recited in claim 26, wherein a respective version indicated by the input includes a version of a particular digital media object that includes one or more changes applied to the particular digital media object in response to a command received after the particular modification operation is performed.

* * * * *